US010457768B2

(12) United States Patent
Takahashi et al.

(10) Patent No.: US 10,457,768 B2
(45) Date of Patent: Oct. 29, 2019

(54) MODIFIED POLYCARBODIIMIDE COMPOUND, CURING AGENT, AND THERMOSETTING RESIN COMPOSITION

(71) Applicant: NISSHINBO CHEMICAL INC., Tokyo (JP)

(72) Inventors: Ikuo Takahashi, Ichihara (JP); Takahiko Itoh, Chiba (JP); Takahiro Sasaki, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 103 days.

(21) Appl. No.: 15/563,850

(22) PCT Filed: Mar. 30, 2016

(86) PCT No.: PCT/JP2016/060411
§ 371 (c)(1),
(2) Date: Oct. 2, 2017

(87) PCT Pub. No.: WO2016/163285
PCT Pub. Date: Oct. 13, 2016

(65) Prior Publication Data
US 2018/0094095 A1 Apr. 5, 2018

(30) Foreign Application Priority Data
Apr. 6, 2015 (JP) .................. 2015-077971

(51) Int. Cl.
C08G 18/76 (2006.01)
C08G 18/02 (2006.01)
C08G 18/83 (2006.01)
C08L 63/00 (2006.01)
C08L 101/08 (2006.01)

(52) U.S. Cl.
CPC ........... *C08G 18/025* (2013.01); *C08G 18/76* (2013.01); *C08G 18/83* (2013.01); *C08G 18/833* (2013.01); *C08L 63/00* (2013.01); *C08L 101/08* (2013.01); *C08J 2300/24* (2013.01)

(58) Field of Classification Search
CPC .................................................. C08G 18/025
See application file for complete search history.

(56) References Cited

U.S. PATENT DOCUMENTS

| 4,067,820 A | 1/1978 | Wagner et al. |
| 4,294,719 A | 10/1981 | Wagner et al. |
| 5,576,398 A | 11/1996 | Takahashi et al. |
| 6,225,417 B1 | 5/2001 | Imashiro et al. |
| 6,300,425 B1 | 10/2001 | Amano et al. |

FOREIGN PATENT DOCUMENTS

| EP | 0928825 A2 | 7/1999 |
| JP | 47-24680 B1 | 7/1972 |
| JP | 51-101798 A | 7/1972 |
| JP | 51-101918 A | 9/1976 |
| JP | 8-81533 A | 3/1996 |
| JP | 10-36469 A | 2/1998 |
| JP | 10-60272 A | 3/1998 |
| JP | 11-60667 A | 3/1999 |
| JP | 11-322899 A | 11/1999 |
| JP | 2000-136231 A | 5/2000 |
| JP | 2007-138080 A | 6/2007 |
| JP | 2007-297491 A | 11/2007 |
| JP | 2013-50549 A | 3/2013 |
| JP | 2013-112755 A | 6/2013 |

OTHER PUBLICATIONS

U.S. Appl. No. 15/563,043, filed Sep. 29, 2017.
International Search Report, issued in PCT/JP2016/060411, PCT/ISA/210, dated Jul. 5, 2016.
International Search Report (Form PCT/ISA/210) for International Application No. PCT/JP2016/060410, dated Jul. 5, 2016.
Extended European Search Report for European Application No. 16776451.3, dated Oct. 26, 2018.

*Primary Examiner* — Arrie L Reuther
(74) *Attorney, Agent, or Firm* — Birch, Stewart, Kolasch & Birch, LLP

(57) ABSTRACT

The modified polycarbodiimide compound of the present invention is obtained by modifying a polycarbodiimide compound derived from a diisocyanate compound with at least one aliphatic amine selected from the group consisting of diethylamine, methylisopropylamine, tert-butylethylamine, di-sec-butylamine, dicyclohexylamine, 2-methylpiperidine and 2,6-dimethylpiperidine. The curing agent of the present invention comprises the modified polycarbodiimide compound of the present invention. The thermosetting resin composition of the present invention comprises a carboxyl group-containing resin having a carboxyl group in a molecule or an epoxy resin having two or more epoxy groups in one molecule, and the curing agent of the present invention. Thus, a modified polycarbodiimide compound that can allow a resin composition to be cured at a relatively low temperature and that can suppress curing of a resin composition in a drying step before a thermal curing step of a resin composition, a curing agent comprising the modified polycarbodiimide compound, and a thermosetting resin composition comprising the curing agent can be provided.

9 Claims, No Drawings

MODIFIED POLYCARBODIIMIDE COMPOUND, CURING AGENT, AND THERMOSETTING RESIN COMPOSITION

TECHNICAL FIELD

The present invention relates to a modified polycarbodiimide compound obtained by modifying a polycarbodiimide compound derived from a diisocyanate compound, a curing agent comprising the modified polycarbodiimide compound, and a thermosetting resin composition comprising the curing agent.

BACKGROUND ART

There is known, as a conventional art, a resin composition such as a photo-sensitive resin composition and a curing type aqueous resin composition in which a polycarbodiimide compound is used as a curing agent (see, for example, PTL1 and PTL2). A polycarbodiimide compound is excellent as a curing agent of a resin composition, because of having low toxicity. Polycarbodiimide, however, has the problems of being low in solubility in various solvents, and also being difficult to store for a long period even in a cold dark place because the state of a solution thereof causes a reaction of a carbodiimide group and aggregation of a polymer to gradually progress, thereby forming gel.

In order to solve such problems, there is known, as a conventional art, a modified polycarbodiimide compound that has very excellent storage stability due to modification of polycarbodiimide derived from an aromatic diisocyanate compound with diisopropylamine (see, for example, PTL3).

CITATION LIST

Patent Literature

PTL1: JP 2013-050549 A
PTL2: JP 2007-297491 A
PTL3: JP 2007-138080 A

SUMMARY OF INVENTION

Technical Problem

A resin composition in which a modified polycarbodiimide compound is used is usually dried before thermal curing. In the drying step of the resin composition, the resin composition is desirably uncured as little as possible in order to efficiently dry the resin composition. The drying temperature and the thermal curing temperature of the resin composition may vary depending on the solvent used in polycarbodiimide compound synthesis and a counter resin to which a curing agent is added. Therefore, it is necessary to prepare a modified polycarbodiimide compound with any substance other than diisopropylamine, which can be used as a curing agent at various drying temperatures and thermal curing temperatures. In addition, when the modified polycarbodiimide compound is cured, the thermal curing temperature in curing of the modified polycarbodiimide compound is desirably low in order to minimize deterioration due to heating of a main agent and a substrate which are to be heated together, and suppress yellowing of a resin cured.

An object of the present invention is then to provide a modified polycarbodiimide compound that can allow for curing at a relatively low temperature and that can suppress curing of a resin composition in a drying step before a thermal curing step of a resin composition, a curing agent comprising the modified polycarbodiimide compound, and a thermosetting resin composition comprising the curing agent, and another object thereof is to expand assortment of products of a modified polycarbodiimide compound with any substance other than diisopropylamine, which can be used at various drying temperatures and thermal curing temperatures.

Solution to Problem

The present inventors have made intensive studies for achieving the above object, and as a result, has found that a polycarbodiimide compound derived from a diisocyanate compound can be modified with a predetermined aliphatic amine, thereby providing a modified polycarbodiimide compound that can allow a resin composition to be cured at a relatively low temperature and that can suppress curing of a resin composition in a drying step before a thermal curing step of a resin composition, and also expanding assortment of products of a modified polycarbodiimide compound with any substance other than diisopropylamine, to thereby complete the present invention.

That is, the present invention is as follows.

[1] A modified polycarbodiimide compound obtained by modifying a polycarbodiimide compound derived from a diisocyanate compound with at least one aliphatic amine selected from the group consisting of diethylamine, methylisopropylamine, tert-butylethylamine, di-sec-butylamine, dicyclohexylamine, 2-methylpiperidine and 2,6-dimethylpiperidine.

[2] The modified polycarbodiimide compound according to [1], wherein the aliphatic amine is at least one aliphatic amine selected from the group consisting of diethylamine, tert-butylethylamine, di-sec-butylamine, dicyclohexylamine, 2-methylpiperidine and 2,6-dimethylpiperidine.

[3] The modified polycarbodiimide compound according to [2], wherein the aliphatic amine is at least one aliphatic amine selected from the group consisting of diethylamine, tert-butylethylamine, di-sec-butylamine, dicyclohexylamine and 2-methylpiperidine.

[4] The modified polycarbodiimide compound according to [3], wherein the aliphatic amine is di-sec-butylamine.

[5] The modified polycarbodiimide compound according to any one of [1] to [4], wherein the diisocyanate compound is an aromatic diisocyanate compound.

[6] The modified polycarbodiimide compound according to [5], wherein the aromatic diisocyanate compound is at least one aromatic diisocyanate compound selected from the group consisting of 4,4'-diphenylmethane diisocyanate, 2,4-tolylene diisocyanate and 2,6-tolylene diisocyanate.

[7] A curing agent comprising the modified polycarbodiimide compound according to any one of [1] to [6].

[8] A thermosetting resin composition comprising a carboxyl group-containing resin having a carboxyl group in a molecule or an epoxy resin having two or more epoxy groups in one molecule, and the curing agent according to [7].

[9] The thermosetting resin composition according to [8], wherein the carboxyl group-containing resin is at least one resin selected from the group consisting of a polyurethane resin, a polyamide resin, an acrylic resin, a vinyl acetate resin, a polyolefin resin and a polyimide resin.

Advantageous Effects of Invention

The present invention can provide a modified polycarbodiimide compound that can allow a resin composition to be cured at a relatively low temperature and that can suppress curing of a resin composition in a drying step before a thermal curing step of a resin composition, a curing agent comprising the modified polycarbodiimide compound, and a thermosetting resin composition comprising the curing agent, and can expand assortment of products of a modified polycarbodiimide compound with any substance other than diisopropylamine.

DESCRIPTION OF EMBODIMENTS

[Modified Polycarbodiimide Compound]

The modified polycarbodiimide compound of the present invention is obtained by modifying a polycarbodiimide compound derived from a diisocyanate compound with an aliphatic amine.

(Aliphatic Amine)

From the viewpoint of capability of modifying the polycarbodiimide compound derived from a diisocyanate compound and high dissociation property from the polycarbodiimide compound, the aliphatic amine for use in the modified polycarbodiimide compound of the present invention is at least one aliphatic amine selected from the group consisting of diethylamine, methylisopropylamine, tert-butylethylamine, di-sec-butylamine, dicyclohexylamine, 2-methylpiperidine and 2,6-dimethylpiperidine, preferably at least one aliphatic amine selected from the group consisting of diethylamine, tert-butylethylamine, di-sec-butylamine, dicyclohexylamine, 2-methylpiperidine and 2,6-dimethylpiperidine, more preferably at least one aliphatic amine selected from the group consisting of diethylamine, tert-butylethylamine, di-sec-butylamine, dicyclohexylamine and 2-methylpiperidine, further preferably di-sec-butylamine. Thus, the drying temperature of a resin composition can be set to a temperature lower than the temperature at which the aliphatic amine starts to dissociate from the modified polycarbodiimide compound and the thermal curing temperature of a resin composition can be set to a temperature higher than the temperature at which the aliphatic amine starts to dissociate from the modified polycarbodiimide compound, thereby suppressing curing of a resin composition in a drying step and also ensuring curing of a resin composition in a thermal curing step. In addition, the thermal curing temperature of a resin composition can be relatively low. Furthermore, it is possible to expand assortment of products of a modified polycarbodiimide compound with any substance other than diisopropylamine.

Herein, a modified carbodiimide group formed by modifying a carbodiimide group with the aliphatic amine is low in reactivity, and therefore can barely cure a resin composition. When the aliphatic amine, however, dissociates from the modified polycarbodiimide compound, the modified carbodiimide group is turned back to a carbodiimide group before modification with the aliphatic amine. As described above, reactivity of a carbodiimide group is high, and therefore the aliphatic amine dissociates from the modified polycarbodiimide compound to thereby allow a resin composition to be thermally cured by a carbodiimide group formed. In addition, when the aliphatic amine is high in dissociation property from the modified polycarbodiimide compound, a carbodiimide group converted from the modified carbodiimide group is increased in terms of the number thereof, and therefore curing of a resin composition effectively progresses according thereto, leading to more complete curing of a resin composition.

For example, when the aliphatic amine is di-sec-butylamine, a polycarbodiimide compound derived from a diisocyanate compound, having a carbodiimide group of formula (1), is modified with the aliphatic amine, to thereby form a modified carbodiimide group of formula (2). The modified carbodiimide group of formula (2) is low in reactivity due to steric hindrance of a moiety of formula (3) in formula (2). When di-sec-butylamine then dissociates, a carbodiimide group of formula (1), high in reactivity, is formed to thereby allow the modified polycarbodiimide compound to cure a resin composition.

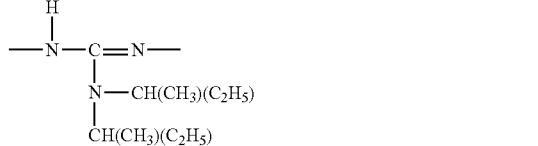

(Polycarbodiimide Compound)

The polycarbodiimide compound for use in the modified polycarbodiimide compound of the present invention is a polycarbodiimide compound derived from a diisocyanate compound, preferably a polycarbodiimide compound derived from an aromatic diisocyanate compound. The diisocyanate compound here refers to an isocyanate compound having two isocyanate groups in a molecule, and the aromatic diisocyanate compound here refers to an isocyanate compound in which two isocyanate groups present in a molecule are directly bound to an aromatic ring. Examples of the polycarbodiimide compound derived from a diisocyanate compound include a polycarbodiimide compound derived from an aromatic diisocyanate compound and a polycarbodiimide compound derived from an aliphatic diisocyanate compound. The polycarbodiimide compound derived from an aromatic diisocyanate compound is excellent in heat resistance as compared with the polycarbodiimide compound derived from an aliphatic diisocyanate compound, and therefore the polycarbodiimide compound derived from an aromatic diisocyanate compound is preferable.

The polycarbodiimide compound derived from a diisocyanate compound has a group represented by the following general formula (4), for example:

[Formula 4]

wherein R represents a residue obtained by removing an isocyanate group from a diisocyanate compound.

Examples of the aromatic diisocyanate compound from which the polycarbodiimide compound for use in the modified polycarbodiimide compound of the present invention is derived include 4,4'-diphenylmethane diisocyanate, 4,4'-diphenyl ether diisocyanate, p-phenylene diisocyanate, m-phenylene diisocyanate, 3,3'-dimethoxy-4,4'-biphenyl diisocyanate, o-tolidine diisocyanate, naphthylene diisocyanate, 2,4-tolylene diisocyanate, 2,6-tolylene diisocyanate, 3,3'-dimethyl-4,4'-diphenyl ether diisocyanate and 3,3'-dimethyl-4,4'-diphenyl ether diisocyanate. These may be used singly or in combinations of two or more thereof. A preferable aromatic diisocyanate compound is at least one selected from the group consisting of 4,4'-diphenylmethane diisocyanate, 2,4-tolylene diisocyanate and 2,6-tolylene diisocyanate in terms of heat resistance.

(Polycarbodiimide Copolymer)

The polycarbodiimide for use in the present invention may be an aromatic polycarbodiimide copolymer that is synthesized with at least one aromatic diisocyanate compound as a raw material and that has at least two carbodiimide groups in a molecule.

The copolymer can be obtained by copolymerizing an aromatic polycarbodiimide with, for example, polyether polyol, polyester polyol, polycarbonate polyol, or polybutadiene diol.

(Method for Producing Polycarbodiimide Compound)

The polycarbodiimide compound for use in the modified polycarbodiimide compound of the present invention can be produced by various methods where a diisocyanate compound is used as a raw material. Examples include a method in which the aromatic diisocyanate compound is subjected to a decarboxylation condensation reaction accompanied with decarbonation, to produce an isocyanate-terminated polycarbodiimide (U.S. Pat. No. 2,941,956 B, JP 47-33279 B, J. Org. Chem, 28, 2069-2075 (1963), Chemical Review 1981, Vol. 81, No. 4, pp. 619-621).

The decarboxylation condensation reaction of the above described aromatic diisocyanate compound progresses in the presence of a carbodiimidation catalyst. Examples of the carbodiimidation catalyst can include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers thereof, and, among them, 3-methyl-1-phenyl-2-phospholene-1-oxide is suitable in terms of reactivity. The amount of the carbodiimidation catalyst is usually 0.1 to 1.0% by mass relative to the aromatic diisocyanate compound for use in carbodiimidation.

The decarboxylation condensation reaction of the aromatic diisocyanate compound can be performed in no solvent or in a solvent. Examples of the solvent that can be used include alicyclic ethers such as tetrahydroxyfuran (THF), 1,3-dioxane and dioxolane:aromatic hydrocarbons such as benzene, toluene, xylene and ethylbenzene:halogenated hydrocarbons such as chlorobenzene, dichlorobenzene, trichlorobenzene, perchlene, trichloroethane and dichloroethane:ester-based solvents such as ethyl acetate and butyl acetate: and ketone-based solvents such as methyl ethyl ketone (MEK), methyl isobutyl ketone and cyclohexanone. These may be used singly or in combinations of two or more thereof. Among them, toluene, tetrahydroxyfuran, and methyl ethyl ketone are preferable.

The temperature in the above described decarboxylation condensation reaction is not particularly limited, and it is preferably 40 to 200° C., more preferably 50 to 130° C. When the reaction is performed in the solvent, the temperature is preferably 40° C. to the boiling point of the solvent. In addition, when the reaction is performed in the solvent, the concentration of the aromatic diisocyanate compound is preferably 5 to 55% by mass, more preferably 5 to 40% by mass. When the concentration of the aromatic diisocyanate compound is 5% by mass or more, a so long time for polycarbodiimide synthesis is not taken, and when the concentration is 55% by mass or less, gelation during the reaction can be suppressed. In addition, the solid content concentration during the reaction is preferably 5 to 55% by mass, more preferably 20 to 50% by mass based on the total amount of the reaction system.

(End-Capping of Aromatic Polycarbodiimide)

In the present invention, the polycarbodiimide can be used in which the degree of polymerization is controlled to a proper value by use of a compound that reacts with an end isocyanate group of the polycarbodiimide, such as monoisocyanate.

Examples of the monoisocyanate that can be used to cap the end of the polycarbodiimide to control the degree of polymerization include phenyl isocyanate, p- and m-tolyl isocyanates, and p-isopropylphenyl isocyanate. In particular, phenyl isocyanate is suitably used.

In addition to the above, a compound that can serve as a capping agent to react with end isocyanate can be methanol, isopropyl alcohol, phenol, polyethylene glycol monomethyl ether or the like bearing a hydroxy group: butylamine, diethylamine or the like bearing an amino group: or propionic acid, benzoic acid, acid anhydride or the like bearing a carboxyl group.

(Modification of Polycarbodiimide Compound with Aliphatic Amine)

As described above, the modified polycarbodiimide compound of the present invention is obtained by modifying the polycarbodiimide compound with the aliphatic amine. Modification of the polycarbodiimide compound with the aliphatic amine can be, for example, performed as follows. While modification of the polycarbodiimide compound with the aliphatic amine can also be performed in no solvent, such synthesis can also be performed by mixing the polycarbodiimide compound with an organic solvent, adding the aliphatic amine thereto so that a predetermined equivalent relative to the carbodiimide group is achieved, and stirring and reacting the resultant.

In the case where the organic solvent is used, the amount of the aliphatic amine added is preferably 1 to 2 equivalents based on 1 equivalent of the carbodiimide group, and is more preferably 1 to 1.2 equivalents from the viewpoints that the amount of the aliphatic amine is not excessive and the amine is easily escaped in a heating treatment. In addition, the reaction temperature in modification of the polycarbodiimide compound with the aliphatic amine is preferably ordinary temperature (about 25° C.) or 40 to 80° C. from the viewpoints of the reaction speed and suppression of a side reaction in the modification. The modification of the polycarbodiimide compound with the aliphatic amine is preferably performed with stirring, and the reaction time, which varies depending on the temperature, is preferably about 0.1 to 10 hours.

(Curing Agent)

The curing agent of the present invention comprises the modified polycarbodiimide compound of the present invention. Thus, when the curing agent of the present invention is used, the drying temperature of a resin composition can be set to a temperature lower than the temperature at which the aliphatic amine starts to dissociate from the modified polycarbodiimide compound and the thermal curing temperature of a resin composition can be set to a temperature higher than the temperature at which the aliphatic amine starts to dissociate from the modified polycarbodiimide compound, thereby suppressing curing of a resin composition in a drying step and also ensuring curing of a resin composition in a thermal curing step. In addition, the thermal curing temperature in curing of a resin composition can be relatively low. Herein, a preferable thermal curing temperature is 90 to 150° C. When the thermal curing temperature is 90 to 150° C., a thermosetting resin composition can be sufficiently cured and also deterioration of a main agent and a substrate due to heating, yellowing of a resin cured, and the like can be suppressed.

[Thermosetting Resin Composition]

The thermosetting resin composition of the present invention comprises the curing agent of the present invention, and a resin. The resin comprised in the thermosetting resin composition of the present invention is not particularly limited as long as it is a resin which is reacted with and cross-linked to a carbodiimide group, and it is, for example, a carboxyl group-containing resin having a carboxyl group in a molecule or an epoxy resin having two or more epoxy groups in one molecule. A preferable carboxyl group-containing resin is at least one resin selected from the group consisting of a polyurethane resin, a polyamide resin, an acrylic resin, a vinyl acetate resin, a polyolefin resin and a polyimide resin, from the viewpoint of easiness of the crosslinking reaction with a carbodiimide group.

The thermosetting resin composition of the present invention preferably comprises, for example, 0.5 to 1.5 equivalents of the curing agent of the present invention, more preferably 0.8 to 1.2 equivalents based on the functional group equivalent of the main agent (resin). In addition, to the thermosetting resin composition of the present invention can be, if necessary, appropriately compounded various additive components such as a pigment, a filler, a leveling agent, a surfactant, a dispersant, a plasticizer, an ultraviolet absorber, and an antioxidant, depending on the intended use and the like.

A coating film can be obtained by application of the thermosetting resin composition of the present invention to a predetermined substrate to form a coating layer. In such a case, a conventionally known method can be appropriately used as a coating method, and for example, brush coating, coating with a wad, spray coating, hot spray coating, airless spray coating, roller coating, curtain flow coating, flow coating, dip coating, and knife-edge coating can be used. After formation of the coating layer, a heating treatment can also be performed in order to promote the crosslinking reaction. The heating treatment method is not particularly limited, and for example, a method in which an electric heating furnace, an infrared heating furnace, a high-frequency furnace, or the like is used can be adopted.

EXAMPLES

Hereinafter, the present invention will be more specifically described with reference to Examples and Comparative Examples, but the present invention is not intended to be limited thereto. It is noted that "%" in the context is on a mass basis hereinafter, unless particularly noted.

[Production of Modified Polycarbodiimide Compound]

A polycarbodiimide compound produced in any Synthesis Example of Synthesis Examples 1 to 3 below was used to produce a modified polycarbodiimide compound of each of Examples and Comparative Examples, as described below.

Synthesis Example 1

A reaction vessel equipped with a reflux tube and a stirrer was charged with 100 parts by mass of tolylene diisocyanate (composition: 80% of 2,4-tolylene diisocyanate and 20% of 2,6-tolylene diisocyanate), 71.8 parts by mass of a polyalkylene carbonate diol (produced by Asahi Kasei Chemicals Corporation, DURANOL T-5651, molecular weight: 1000), 17.1 parts by mass of phenyl isocyanate, 245 parts by mass of toluene (boiling point: 110.6° C.), and 1.0 part by mass of a carbodiimidation catalyst (3-methyl-1-phenyl-2-phospholene-1-oxide), and the resultant was stirred under a nitrogen stream at 100° C. for 3 hours. It was confirmed from the results of measurement of infrared (IR) absorption spectrum that an absorption peak attributed to an isocyanate group at a wavelength of about 2270 $cm^{-1}$ almost disappeared and that an absorption peak attributed to a carbodiimide group at a wavelength of about 2150 $cm^{-1}$ was observed, and a polycarbodiimide compound of Synthesis Example 1 was obtained.

Synthesis Example 2

A reaction vessel equipped with a reflux tube and a stirrer was charged with 100 parts by mass of tolylene diisocyanate (composition: 80% of 2,4-tolylene diisocyanate and 20% of 2,6-tolylene diisocyanate), 71.8 parts by mass of a polyalkylene carbonate diol (produced by Asahi Kasei Chemicals Corporation, DURANOL T-5651, molecular weight: 1000), 17.1 parts by mass of phenyl isocyanate, 245 parts by mass of tetrahydrofuran (THF, boiling point: 66° C.), and 1.0 part by mass of a carbodiimidation catalyst (3-methyl-1-phenyl-2-phospholene-1-oxide), and the resultant was stirred under a nitrogen stream with a solvent reflux for 6 hours. It was confirmed from the results of measurement of infrared (IR) absorption spectrum that an absorption peak attributed to an isocyanate group at a wavelength of about 2270 $cm^{-1}$ almost disappeared and that an absorption peak attributed to a carbodiimide group at a wavelength of about 2150 $cm^{-1}$ was observed, and a polycarbodiimide compound of Synthesis Example 2 was obtained.

Synthesis Example 3

A reaction vessel equipped with a reflux tube and a stirrer was charged with 100 parts by mass of tolylene diisocyanate (composition: 80% of 2,4-tolylene diisocyanate and 20% of 2,6-tolylene diisocyanate), 71.8 parts by mass of a polyalkylene carbonate diol (produced by Asahi Kasei Chemicals Corporation, DURANOL T-5651, molecular weight: 1000), 17.1 parts by mass of phenyl isocyanate, 245 parts by mass of methyl ethyl ketone (MEK, boiling point: 79.5° C.), and 1.0 part by mass of a carbodiimidation catalyst (3-methyl-1-phenyl-2-phospholene-1-oxide), and the resultant was stirred under a nitrogen stream with a solvent reflux for 5 hours. It was confirmed from the results of measurement of infrared (IR) absorption spectrum that an absorption peak attributed to an isocyanate group at a wavelength of about 2270 $cm^{-1}$ almost disappeared and that an absorption peak attributed to a carbodiimide group at a wavelength of about 2150 $cm^{-1}$ was observed, and a polycarbodiimide compound of Synthesis Example 3 was obtained.

Example 1

The polycarbodiimide compound obtained in Synthesis Example 1, in the state of being still placed in the reaction vessel, was cooled to 50° C., and 42.8 parts by mass of diethylamine (DEA) was added thereto and stirred for 5 hours. It was confirmed from the results of measurement of infrared (IR) absorption spectrum that an absorption peak attributed to a guanidine group at a wavelength of about 1660 $cm^{-1}$ appeared and that an absorption peak attributed to a carbodiimide group at a wavelength of about 2150 $cm^{-1}$ almost disappeared, and a modified polycarbodiimide compound of Example 1 was obtained.

Examples 2 to 7, Comparative Examples 1 and 2, and Reference Example 1

A polycarbodiimide compound of each of Examples 2 to 7, Comparative Examples 1 and 2, and Reference Example 1 was obtained in the same manner as in the modified polycarbodiimide compound of Example 1 except that the carbodiimide compound to be used, the aliphatic amine to be added, and the amount thereof were as shown in Table 1.

[Evaluation of Modified Polycarbodiimide Compound]

(Dissociation Property of Aliphatic Amine)

The modified polycarbodiimide compound of each of Examples 1 to 7, Comparative Examples 1 and 2, and Reference Example 1 was heated at 170° C., and the modified polycarbodiimide compound after 30 minutes from the start of heating was subjected to measurement of infrared (IR) absorption spectrum. The peak intensity of an absorption peak attributed to a carbodiimide group at a wavelength of about 2150 cm$^{-1}$ in the infrared spectrum obtained by the measurement was then examined. The peak intensity examined was divided by the peak intensity of an absorption peak attributed to a carbodiimide group in the polycarbodiimide compound before modification with the aliphatic amine, thereby calculating the proportion (%) of the peak intensity of a peak attributed to a carbodiimide group, which appeared by dissociation of the aliphatic amine after heating, to calculate the dissociation property of the aliphatic amine in the modified polycarbodiimide compound. When the value of the dissociation property is 100%, it can be presumed that all modified carbodiimide groups are converted to carbodiimide groups by dissociation of the aliphatic amine. Here, infrared (IR) absorption spectrum analysis was performed by using FT-IR 8200PC (manufactured by Shimadzu Corporation).

(Dissociation Starting Temperature of Aliphatic Amine)

The modified polycarbodiimide compound of each of Examples 1 to 7, Comparative Examples 1 and 2, and Reference Example 1 was heated at each temperature of 50 to 160° C. for 15 minutes, and the modified polycarbodiimide compound heated was subjected to measurement of infrared (IR) absorption spectrum. The presence of an absorption peak attributed to a carbodiimide group at a wavelength of about 2150 cm$^{-1}$ in the infrared spectrum obtained by the measurement was then examined. When no absorption peak attributed to a carbodiimide group was observed, the aliphatic amine was determined not to dissociate at the heating temperature yet, and when an absorption peak attributed to a carbodiimide group was observed, the aliphatic amine was determined to dissociate at the heating temperature. The lowest temperature of the heating temperature at which the aliphatic amine was determined to dissociate was then defined as the dissociation starting temperature.

(Curability Test)

The modified polycarbodiimide compound (the equivalent of NCN: 134) of each of Examples 1 to 7, Comparative Examples 1 and 2, and Reference Example 1, and a carboxyl group-containing polyurethane resin (the equivalent of COOH: 1100) were mixed so that the equivalent of NCN: the equivalent of COOH=1:1 was satisfied, thereby preparing a thermosetting resin composition. Next, the thermosetting resin composition was cast on a release PET film, dried at the drying temperature shown in Table 1 for 5 minutes, and thereafter heated at each temperature of 80 to 160° C. for 1 hour, to produce a film having a thickness of about 20 μm. A dynamic viscoelasticity measurement apparatus (DMA) (manufactured by SII NanoTechnology Inc., trade name: DMS6100) was then used to examine curing of the film. When the glass transition temperature of the film, measured by the dynamic viscoelasticity measurement apparatus (DMA), was 80° C. or more, the film was determined to be cured. The lowest temperature of the heating temperature at which the thermosetting resin composition was cured was defined as the curing temperature.

[Evaluation Results]

The evaluation results of the modified polycarbodiimide compound of each of Examples 1 to 7, Comparative Examples 1 and 2, and Reference Example 1 are shown in Table 1.

TABLE 1

Evaluation results of modified polycarbodiimide compounds of Examples 1 to 7, Comparative Examples 1 and 2, and Reference Example 1

|  | Example 1 | Example 2 | Example 3 | Example 4 | Example 5 | Example 6 | Example 7 | Comparative Example 1 | Comparative Example 2 | Reference Example 1 |
|---|---|---|---|---|---|---|---|---|---|---|
| Carbodiimide compound | Synthesis Example 1 | Synthesis Example 1 | Synthesis Example 2 | Synthesis Example 1 | Synthesis Example 1 | Synthesis Example 1 | Synthesis Example 3 | Synthesis Example 1 | Synthesis Example 1 | Synthesis Example 1 |
| Synthesis solvent | Toluene | Toluene | THF | Toluene | Toluene | Toluene | MEK | Toluene | Toluene | Toluene |
| Aliphatic amine added | DEA | MIPA | tBEA | DsBA | DCyHA | PIP | RUP | DBA | DIBA | DIPA |
| Amount of aliphatic amine added (parts by mass) | 42.8 | 42.8 | 59.3 | 75.7 | 107.2 | 58.1 | 66.3 | 75.7 | 75.7 | 59.3 |
| Dissociation property | 37% | 44% | 100% | 77% | 98% | 78% | 100% | 29% | 12% | 100% |
| Dissociation starting temperature | 130° C. | 130° C. | 60° C. | 120° C. | 110° C. | 120° C. | 80° C. | 120° C. | 150° C. | 110° C. |
| Curability test Drying temperature | 100° C. | 100° C. | 55° C. | 100° C. | 100° C. | 100° C. | 70° C. | 100° C. | 100° C. | 100° C. |
| Curability test Curing temperature | 140° C. | 140° C. | 100° C. | 130° C. | 110° C. | 140° C. | 100° C. | 160° C. | 160° C. | 120° C. |

DEA: Diethylamine, MIPA: Methylisopropylamine, tBEA: t-Butylmethylamine, DsBA: Di-sec-butylamine
DCyHA: Dicyclohexylamine, PIP: 2-Methylpiperidine, RUP: 2,6-Dimethylpiperidine
DBA: Di-n-butylamine, DIBA: Diisobutylamine, DIPA: Diisopropylamine It was found from evaluation of the dissociation property of the aliphatic amine and evaluation of the dissociation starting temperature of the aliphatic amine that, when the modified polycarbodiimide compound of each of Examples 1 to 7 was used as a curing agent, namely, when a modified polycarbodiimide compound obtained by modifying a polycarbodiimide compound derived from a diisocyanate compound with at least one aliphatic amine selected from the group consisting of diethylamine, methylisopropylamine, tert-butylethylamine, di-sec-butylamine, dicyclohexylamine, 2-methylpiperidine and 2,6-dimethylpiperidine was used as a curing agent, a resin composition could be cured at a relatively low temperature and curing of a resin composition in a drying step before a thermal curing step of a resin composition can be suppressed. On the other hand, it was found that, when the modified polycarbodiimide compound of each of Comparative Examples 1 and 2 was used as a curing agent, namely, when a modified polycarbodiimide compound obtained by modifying a polycarbodiimide compound derived from a diisocyanate compound with di-n-butylamine and diisobutylamine was used as a curing agent, there was caused a need for an increase in the thermal curing temperature. The reason is considered because dissociation property of each of di-n-butylamine and diisobutylamine is low and the dissociation starting temperature thereof is high. In addition, it was found that the dissociation property of the modified polycarbodiimide compound of each of Examples 1 to 7 was comparable with that of diisopropylamine of Reference Example 1 and therefore the modified polycarbodiimide compound of each of Examples 1 to 7 could be used for assortment of products with any substance other than diisopropylamine.

INDUSTRIAL APPLICABILITY

The modified polycarbodiimide composition of the present invention has solution storage stability, high adhesion strength and high heat resistance, and therefore is suitably used as a material for various electronic component applications, such as a base film and/or a coverlay film for a wiring board, or an adhesion film. In particular, a modified polycarbodiimide copolymer further has flexibility and also is excellent in flex resistance (folding resistance), and therefore can be suitably used for a base film and/or a coverlay film for a flexible wiring board. In addition, the modified polycarbodiimide compound of the present invention and the curing agent of the present invention are also useful as a curing agent of a resin composition such as a photosensitive resin composition and a curing type aqueous resin composition.

The invention claimed is:

1. A modified polycarbodiimide compound obtained by modifying a polycarbodiimide compound derived from a diisocyanate compound with at least one aliphatic amine selected from the group consisting of diethylamine, methylisopropylamine, tert-butylethylamine, di-sec-butylamine, 2-methylpiperidine and 2,6-dimethylpiperidine.

2. The modified polycarbodiimide compound according to claim 1, wherein the aliphatic amine is at least one aliphatic amine selected from the group consisting of diethylamine, tert-butylethylamine, di-sec-butylamine, 2-methylpiperidine and 2,6-dimethylpiperidine.

3. The modified polycarbodiimide compound according to claim 2, wherein the aliphatic amine is at least one aliphatic amine selected from the group consisting of diethylamine, tert-butylethylamine, di-sec-butylamine and 2-methylpiperidine.

4. The modified polycarbodiimide compound according to claim 3, wherein the aliphatic amine is di-sec-butylamine.

5. The modified polycarbodiimide compound according to claim 1, wherein the diisocyanate compound is an aromatic diisocyanate compound.

6. The modified polycarbodiimide compound according to claim 5, wherein the aromatic diisocyanate compound is at least one aromatic diisocyanate compound selected from the group consisting of 4,4'-diphenylmethane diisocyanate, 2,4-tolylene diisocyanate and 2,6-tolylene diisocyanate.

7. A curing agent comprising the modified polycarbodiimide compound according to claim 1.

8. A thermosetting resin composition comprising:
   a carboxyl group-containing resin having a carboxyl group in a molecule or an epoxy resin having two or more epoxy groups in one molecule; and
   the curing agent according to claim 7.

9. The thermosetting resin composition according to claim 8, wherein the carboxyl group-containing resin is at least one resin selected from the group consisting of a polyurethane resin, a polyamide resin, an acrylic resin, a vinyl acetate resin, a polyolefin resin and a polyimide resin.

* * * * *